US007066042B2

(12) United States Patent
Andrews et al.

(10) Patent No.: US 7,066,042 B2
(45) Date of Patent: Jun. 27, 2006

(54) ADVANCING/RETRACTING MECHANISM

(75) Inventors: Neville E. Andrews, Naperville, IL (US); Andrew Bielecki, Evanston, IL (US)

(73) Assignee: Sanford L.P., Freeport, IL (US)

( * ) Notice: Subject to any disclaimer, the term of this patent is extended or adjusted under 35 U.S.C. 154(b) by 109 days.

(21) Appl. No.: 10/753,264

(22) Filed: Jan. 7, 2004

(65) Prior Publication Data

US 2005/0147456 A1 Jul. 7, 2005

(51) Int. Cl.
*F16H 21/44* (2006.01)
*F16H 27/00* (2006.01)
*B43K 21/00* (2006.01)

(52) U.S. Cl. ............................ 74/110; 74/112; 74/122; 74/56; 74/567; 401/82; 401/110

(58) Field of Classification Search ................. 74/110, 74/112, 122, 123, 124, 125, 25, 55, 56, 57, 74/58, 59, 567; 401/55, 65, 82, 83, 87, 109, 401/110, 111, 112
See application file for complete search history.

(56) References Cited

U.S. PATENT DOCUMENTS 2,518,429 A * 8/1950 Moorhead ...................... 74/56
3,084,671 A 4/1963 Dottlinger
3,315,643 A * 4/1967 Eratico ....................... 401/109
3,544,227 A * 12/1970 Green ......................... 401/52
3,792,931 A * 2/1974 Ganz .......................... 401/109
3,916,701 A * 11/1975 Butler ........................... 74/57
4,221,490 A * 9/1980 Malm .......................... 401/29
4,533,271 A 8/1985 Sansevero
4,580,918 A * 4/1986 Baker et al. .................. 401/29
4,948,285 A 8/1990 Schleif
4,991,988 A * 2/1991 Snell et al. ................. 401/111
5,004,364 A * 4/1991 Tomura et al. ............. 401/110
5,022,772 A 6/1991 Kageyama et al.
5,026,190 A * 6/1991 Longarzo ..................... 401/30
5,918,993 A * 7/1999 Koyama ..................... 401/106
6,761,231 B1 * 7/2004 Dock et al. ................... 175/51

FOREIGN PATENT DOCUMENTS

DE 1943308 3/1971
DE 10018461 10/2001

OTHER PUBLICATIONS

Copy of International Search Report for International Patent Application No. PCT/US2004/043992, dated Aug. 1, 2005, 7 pages.
Copy of Written Opinion for International Patent Application No. PCT/US2004/043992, dated Aug. 1, 2005, 5 pages.

* cited by examiner

*Primary Examiner*—Richard Ridley
*Assistant Examiner*—Colby Hansen
(74) *Attorney, Agent, or Firm*—Marshall, Gerstein & Borun LLP

(57) ABSTRACT

An advancing/retracting mechanism having a pair of cams is disclosed. The advancing/retracting mechanism includes a first cam, a second cam, and a barrel. The first cam includes an angled surface and a shoe, and the second cam includes an angled surface and a slider. The shoe engages with a helical surface in the barrel, and the slider engages with a straight surface in the barrel. The first cam travels a first distance along the longitudinal axis of the barrel from a first to a second state, and the second cam travels a second distance that is greater then the first distance along the longitudinal axis of the barrel from the first to the second state.

18 Claims, 9 Drawing Sheets

ADVANCING/RETRACTING MECHANISM

TECHNICAL FIELD

The present disclosure relates generally to an advancing/retracting mechanism and, more particularly, to an advancing/retracting mechanism having an output device that travels a greater distance than an input device.

BACKGROUND OF THE DISCLOSURE

Advancing/retracting mechanisms are known in the prior art and have been effectively used in a variety of devices, such as writing utensils, erasers, knifes, etc. For example, advancing/retracting mechanisms are used in writing utensils, such as pens, to advance and retract a writing tip from and into a body of the pen. The advancing/retracting mechanism in one such device includes a body, an activation button, a spring and a rotatable cam. A user activates the advancing/retracting mechanism by depressing the activation button into the body of the pen. The activation button includes a plurality of ribs that engage with a plurality of slots in the body of the pen that are oriented parallel to a central axis of the body, thereby restricting the activation button to axial movement within the body of the pen. The activation button further includes a plurality of pointed teeth on an end adapted to engage with the rotatable cam. The rotatable cam similarly includes a plurality of ribs that engage with the plurality of slots, and a plurality of pointed teeth on an end adapted to engage with pointed teeth on the activation button. The plurality of slots prevent rotation and allow axial movement of the rotatable cam during engagement, and when disengaged from the plurality of slots, the rotatable cam is free to both move axially and rotationally. The engagement of the pointed teeth on the activation button and the rotatable cam, causes a bias on the rotatable cam to rotate. More specifically, when the ribs of the activation button and the rotatable cam are aligned with the slots of the body, the pointed teeth on the activation button and the rotatable cam are misaligned, such that the points of the teeth on the activation button abut sides of the teeth of the rotatable cam. Therefore, as the activation button and hence the rotatable cam is depressed into the body of the pen, the activation button and the rotatable cam will axially move along the plurality of slots, during which the rotatable cam has a bias to align its teeth with those of the activation button. Once the ribs on the rotatable cam clear the slots of the body, and is free to rotate, the teeth of the rotatable cam and the activation button will align, thereby rotating the rotatable cam. Once the rotatable cam has rotated (i.e. the teeth of the rotatable cam and the activation button are aligned), the user will remove force from the activation button, which will cause the bias created by the spring to return the activation button to its original position prior to depression. As the activation button retracts, the ribs of the rotated rotatable cam will abut and rest upon a plurality of stop members, thereby causing rotatable cam to remain in the advanced position.

The advancing/retracting mechanism of another such device includes a hollow body having first and second portions, a slider having a pair of guide posts, and a pair of helical slots located in the first portion. More specifically, the pair of guide posts on the slider slidingly engage with the helical slots in the first portion, thereby producing an axial motion of the slider when rotated relative to the first portion. The slider is permitted to move axially, but is rotationally fixed relative to the second portion. Therefore, during rotation of the first and second portions relative to each other, the slider rotates with the second portion, and the engagement of the posts with the slots causes the slider to advance and retract depending on the direction of rotation.

SUMMARY OF THE DISCLOSURE

In accordance with one aspect of the disclosure, an advancing/retracting mechanism device including a first cam having an angled surface, a second cam having an angled surface, and a barrel, is disclosed. The first cam includes one of a shoe and a helical surface having an axis of rotation, and the second cam includes one of a second shoe and a surface perpendicular to the axis of rotation. The barrel includes the other of the first shoe and the helical surface and the other of the second shoe and the perpendicular surface, wherein at least a portion of one of the cams is disposed in the barrel, and the first shoe abutting the helical surface and the second shoe abutting the perpendicular surface. The angled surfaces of the first and second cams substantially correspond in a first state, and are at least partially opposed in a second state. The first cam travels a first distance along the longitudinal axis of the barrel from the first to the second state and the second cam travels a second distance that is greater then the first distance from the first to the second state.

In accordance with another aspect of the disclosure among others, an advancing/retracting mechanism having a first cam, a second cam, and a barrel, is disclosed. The first cam includes a first end having a first angled surface and a second end that operatively receives input from a user. The second cam includes a first end having a second angled surface that engages with the first angled surface and a second end that operatively activates an output device. The barrel includes a helical surface that engages a portion of one of the first and second cams from a first to a second position, and rotates the cam relative to the other cam.

In accordance with another aspect of the disclosure among others, a writing utensil having a barrel, an input device, and an output device, is disclosed. The barrel includes a first end, a second end, and a helical surface. The input device is located near the second end of the barrel, and is operatively connected to a first cam. The output device is located near the first end of the barrel, and is operatively connected to a second cam. The first cam travels a first distance along the longitudinal axis of the barrel from a first state to a second state, and the second cam travels a second distance along the longitudinal axis of the barrel that is greater than the first distance.

Figure 1:
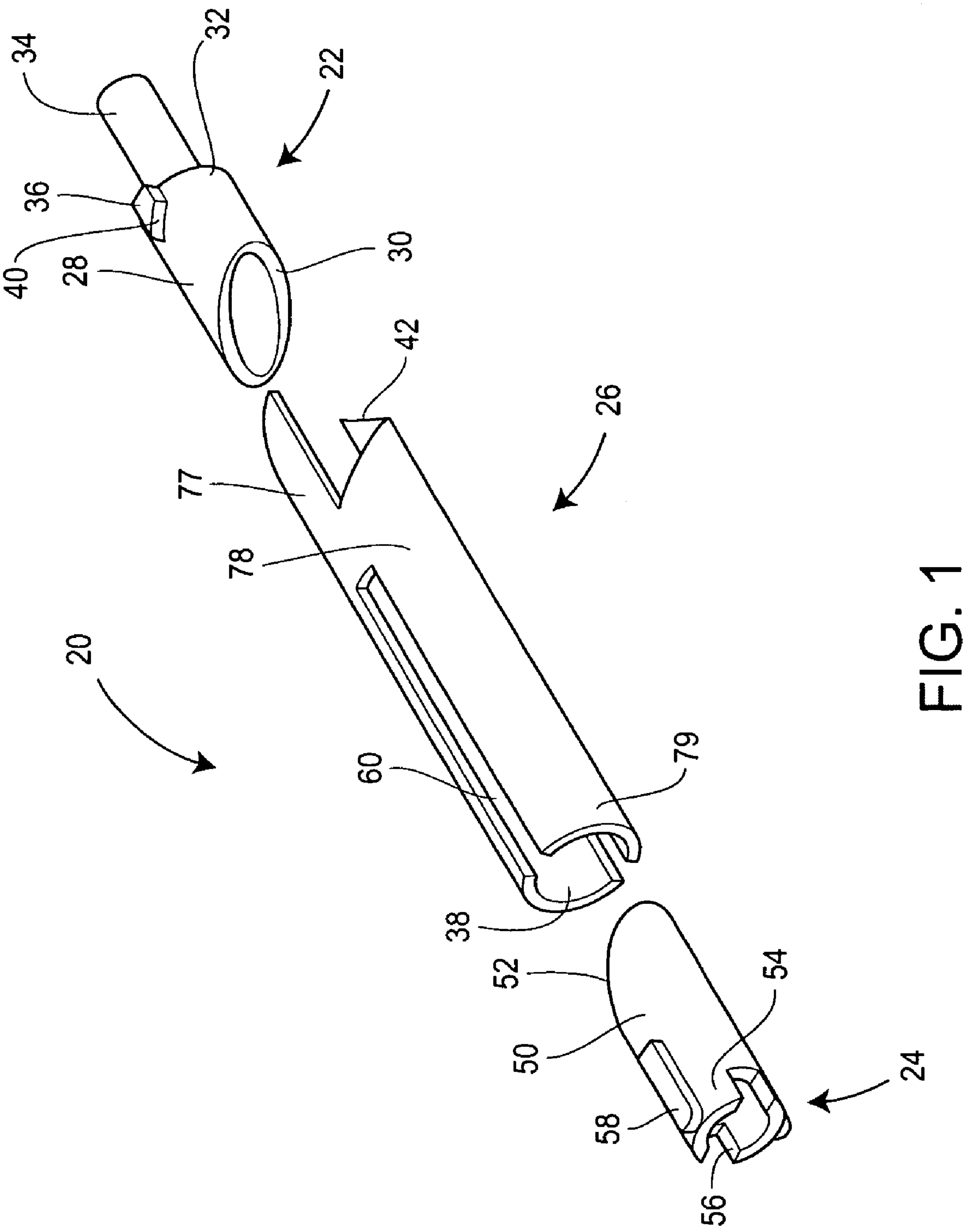
FIG. 1 is an exploded isometric view of one embodiment of an advancing/retracting mechanism.

While the method and device described herein are susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the disclosure as defined by the appended claims.

DETAILED DESCRIPTION

Referring now to the drawings, and with specific reference to FIG. 1, an advancing/retracting mechanism as constructed in accordance with the teachings of the disclosure is generally depicted by reference numeral 20. As shown therein, the advancing/retracting mechanism 20 in one exemplary embodiment includes a first cam 22, a second cam 24, and a barrel 26.

Figure 5:
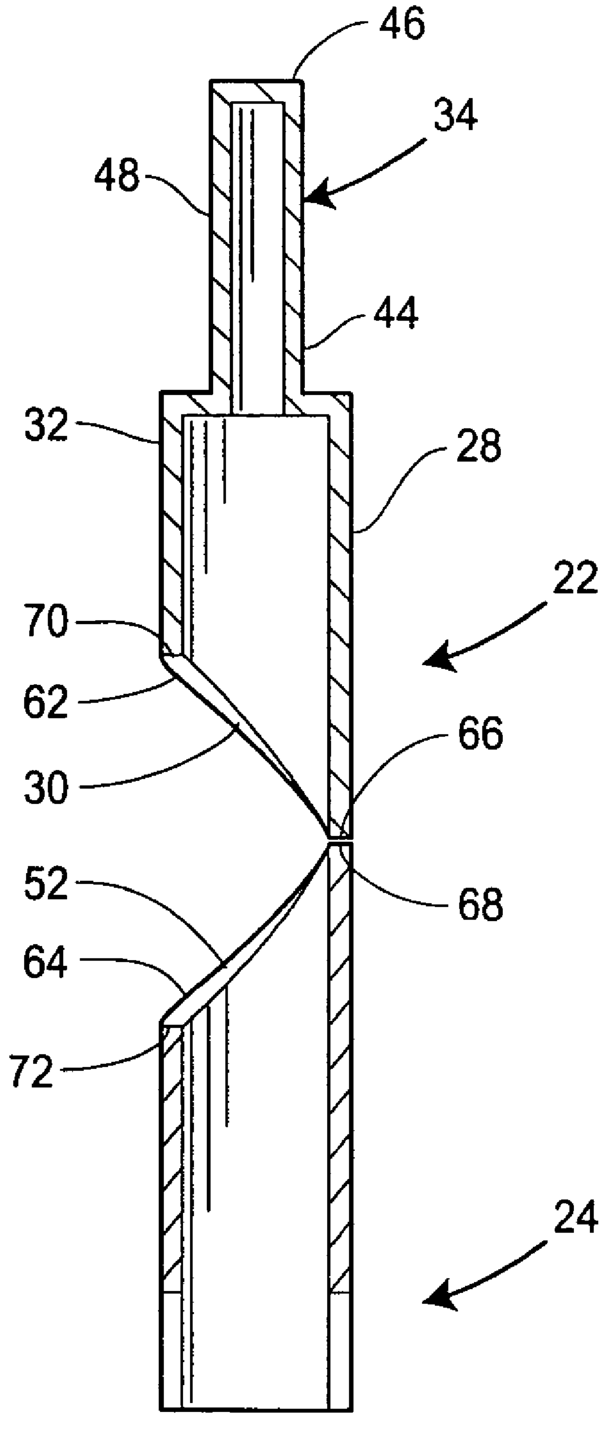
FIG. 5 is a cross-sectional view taken along line 4—4 in FIG. 4 of the advancing/retracting mechanism of FIG. 1 in the advanced state with the barrel removed.
Figure 6:
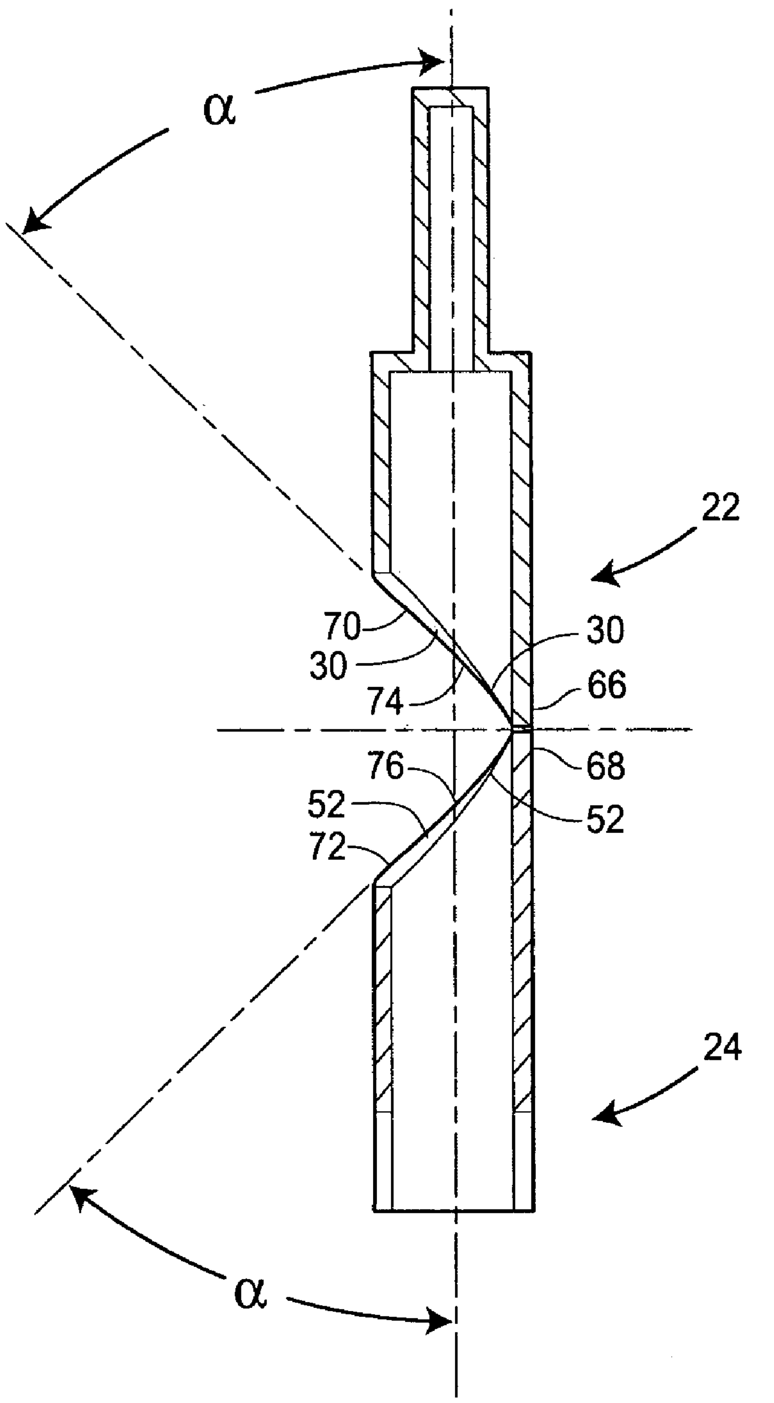
FIG. 6 is a cross-sectional view of the advancing/retracting mechanism similar to FIG. 5.

In one exemplary embodiment, the first cam 22 of the advancing/retracting mechanism 20, as best shown in FIGS. 1 and 5, has a generally cylindrical body 28 including a first angled surface 30, an input end 32, a post 34, and at least one shoe 36. The generally cylindrical body 28 is sized to slide and rotate within a space defined by an inside surface 38 of the barrel 26. The first angled surface 30 is disposed opposite the input end 32 of the first cam 22, and defines an angle $\alpha$ relative to a longitudinal axis of the first cam 22, as shown in FIG. 6.

Figure 2:
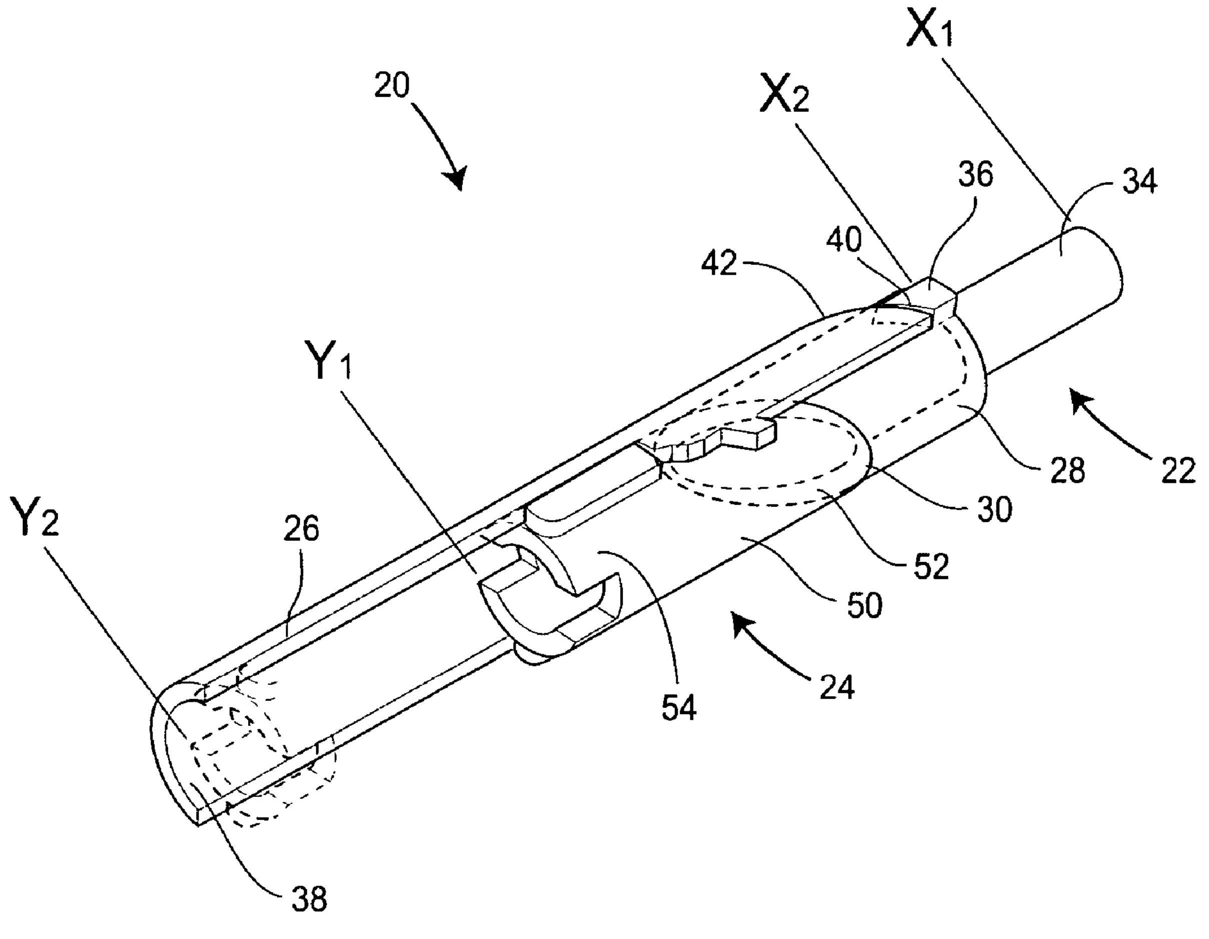
FIG. 2 is an enlarged isometric view of the advancing/retracting mechanism of FIG. 1 in a retracted state, with the barrel partially removed.
Figure 8:
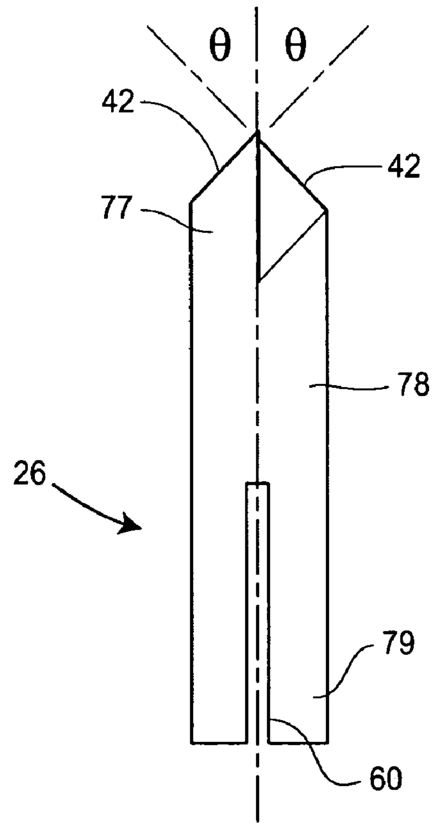
FIG. 8 is a side view of the barrel of FIG. 1.

The at least one shoe 36, and in this embodiment the pair of shoes 36, depend radially outward from the generally cylindrical body 28. As best illustrated in FIGS. 1 and 2, the shoes 36 include an angular contact surface 40, wherein the contact surface 40 and the first angled surface 30 face in similar directions relative to the longitudinal axis of the first cam 22. The angular contact surfaces 40 slidingly engage one or more helical-shaped surfaces 42 located on the barrel 26 (FIGS. 1 and 8).

The post 34 depends axially from the input end 32 of the cam 22. As best illustrated in FIG. 5, the post 34 may include a first end 44 abutting, and integral with, the input end 32, a second end 46 opposite the first end 44, and an outer surface 48. The post 34 may be located such that the longitudinal axis of the post 34 may be coincident with the longitudinal axis of the upper cam 22.

The second cam 24 of the advancing/retracting mechanism 20, as best shown in FIGS. 1 and 5, has a generally cylindrical body 50 including a second angled surface 52, an output end 54, at least one notch 56, and at least one slider or shoe 58. The generally cylindrical body 50 is sized to slide within a space defined by the inside surface 38 of the barrel 26.

The second angled surface 52 is disposed opposite the output end 54 on the second cam 24. The second angled surface 52 of the second cam 24 and the first angled surface 30 of the first cam 22 may have substantially similar angles relative to the longitudinal axis of the cams 22, 24 (FIG. 6). Moreover, when the advancing/retracting mechanism 20 is in a retraced position (FIG. 2), the surface 52 abuts the surface 30 along substantially its entire area.

The sliders 58 depend radially outward from the generally cylindrical body 50 and slidingly engage within at least one slot 60, and in this exemplary embodiment a pair of slots 60 (FIGS. 1 and 8) located in the barrel 26. In this embodiment, the sliders 58 have a generally rectangular shape, but may have any shape adaptable to slide within the slots 60.

The at least one notch 56, and in this exemplary embodiment the pair of notches 56, are located at the output end 54 of the second cam 24, and are oriented such the notches 56 open to the output end 54. The pair of notches 56 are located opposite each other on the cam 24.

The barrel 26 of the advancing/retracting mechanism 20, as best shown in FIGS. 1 and 8, has a generally tubular body 78 including the helical-shaped surfaces 42 located near the first end 77 of the barrel 26, and the pair of slots 60 located near the second end 79 of the barrel 26. The helical-shaped surfaces 42, in this exemplary embodiment, are a pair of helical tracks extending from the first end 77 of the barrel 26 toward the second end 79 of the barrel 26. The helical tracks 42, as shown in FIG. 8, are disposed at an angle $\theta$, relative to the longitudinal axis of the barrel 26, that permits sliding engagement of the helical tracks 42 with the angled surfaces 40 of the shoes 36. It is believed that continuing non-binding engagement of the first cam 22 with the interior surface 38 of the barrel 26 may thus be achieved. The movement of the first cam 22, and more specifically, the shoes 36 along the helical surface 42, rotates the first cam 22 relative to the barrel 26, and causes linear translation of the first cam 22 toward the second end 79 of the barrel 26.

The pair of slots 60 extend upwardly from the second end 79 of the barrel 26 and are adapted to receive the sliding motion of the sliders 58 of the second cam 24. The pair of slots 60 are located opposite each other on the barrel 26, and are oriented parallel to the center axis of the barrel 26. The sliding engagement of the sliders 58 with the pair of slots 60, allows axial movement of the second cam 24 relative to the longitudinal axis of the barrel 26.

Figure 4:
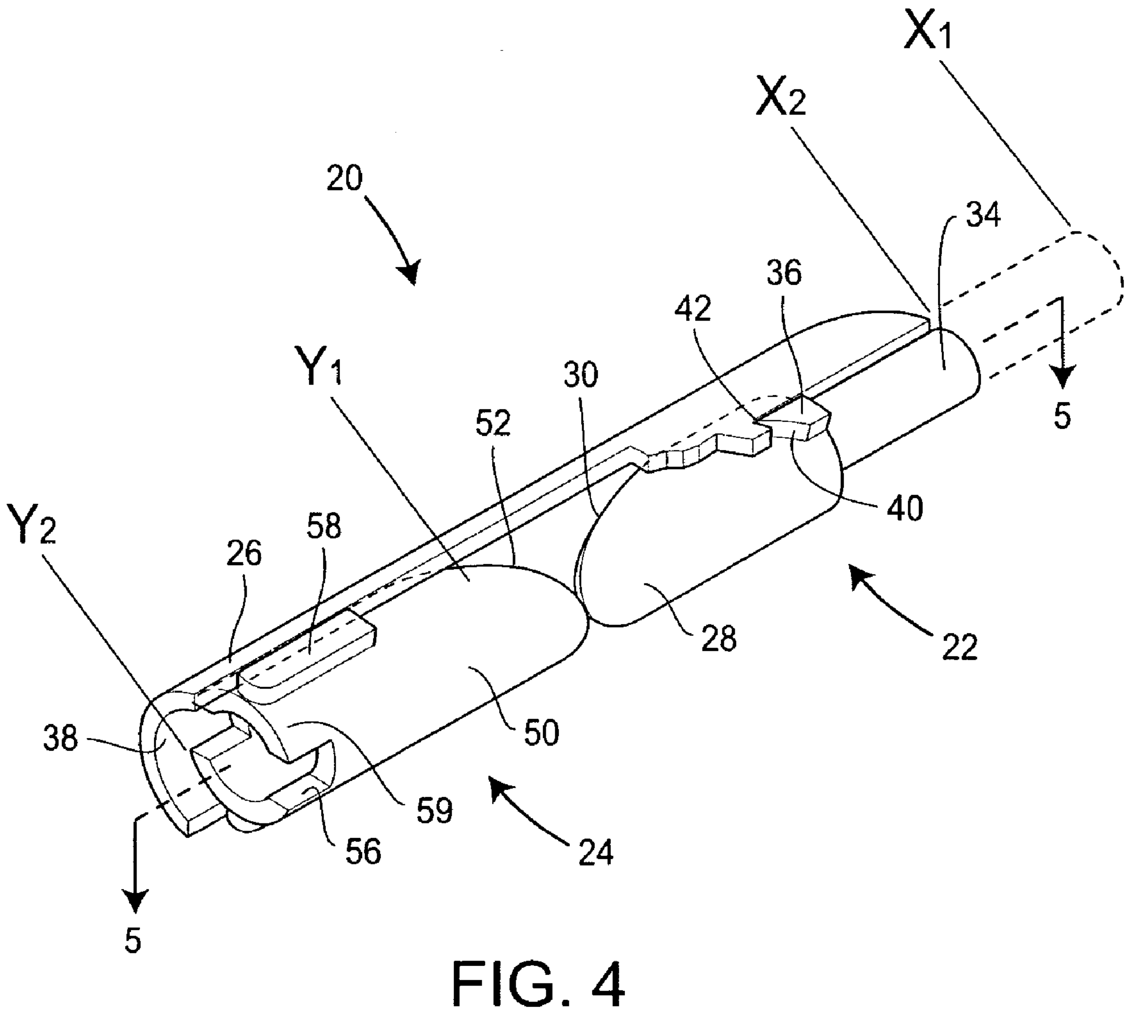
FIG. 4 is an enlarged isometric view of the advancing/retracting mechanism of FIG. 1 in an advanced state, with the barrel partially removed.
Figure 9:
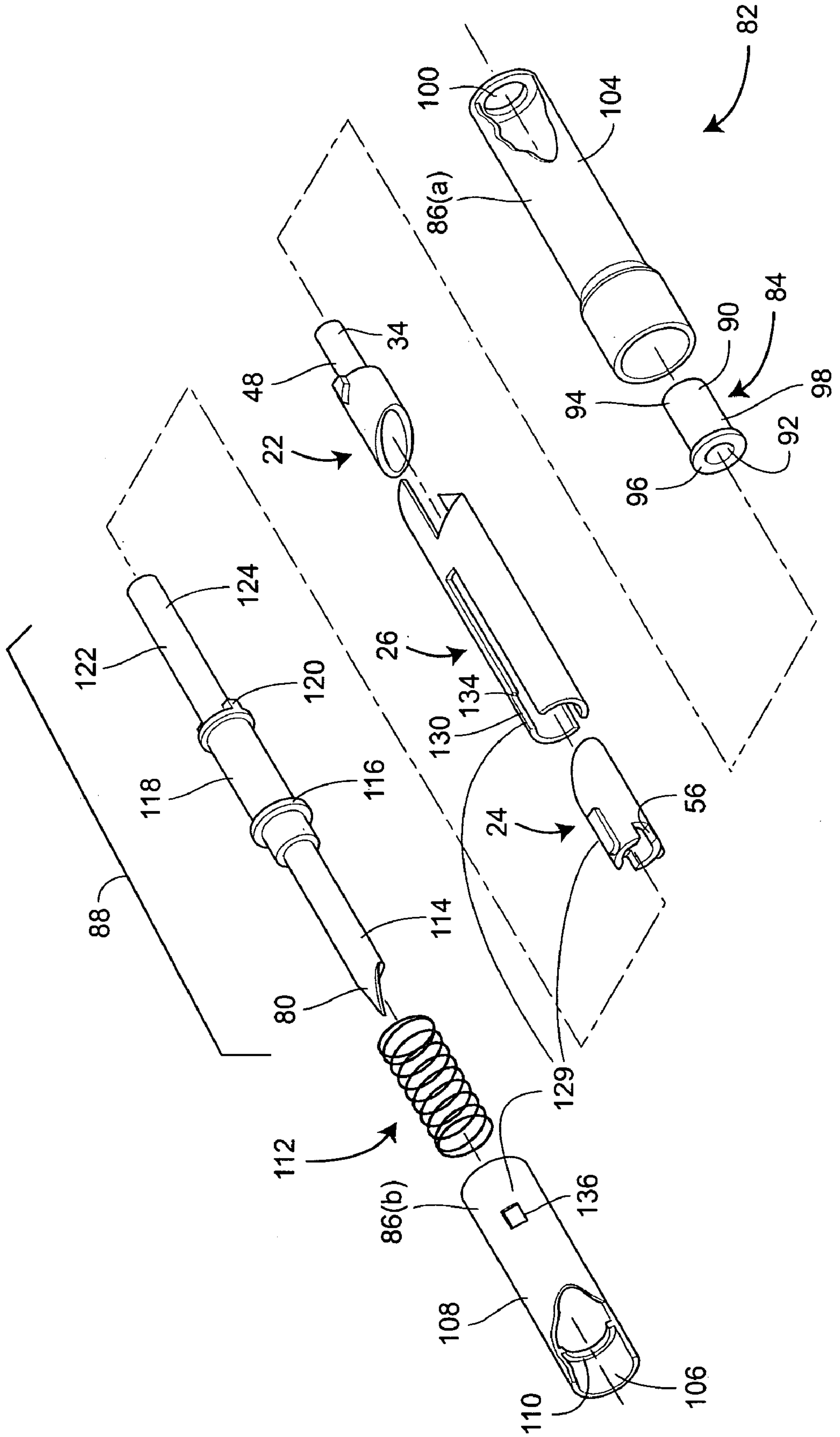
FIG. 9 is an exploded isometric view of a writing utensil incorporating the advancing/retracting mechanism of FIG. 1.

In operation, the advancing/retracting mechanism 20 allows a user to increase the travel of an output device, such as a point of a writing instrument, relative to a user input, as may be appreciated by viewing FIGS. 2, 4 and 9 in combination. In the retracted position, the first cam 22 and the second cam 24 abut each other along the first and second mating surfaces 30, 52. More specifically, when the advancing/retracting mechanism 20 is in the retracted position, the tip 66 of the first angled surface 30 abuts the base 72 of the second cam 24, and the tip 68 of the second angled surface 52 abuts the base 70 of the first cam 22 (FIG. 5).

Figure 3:
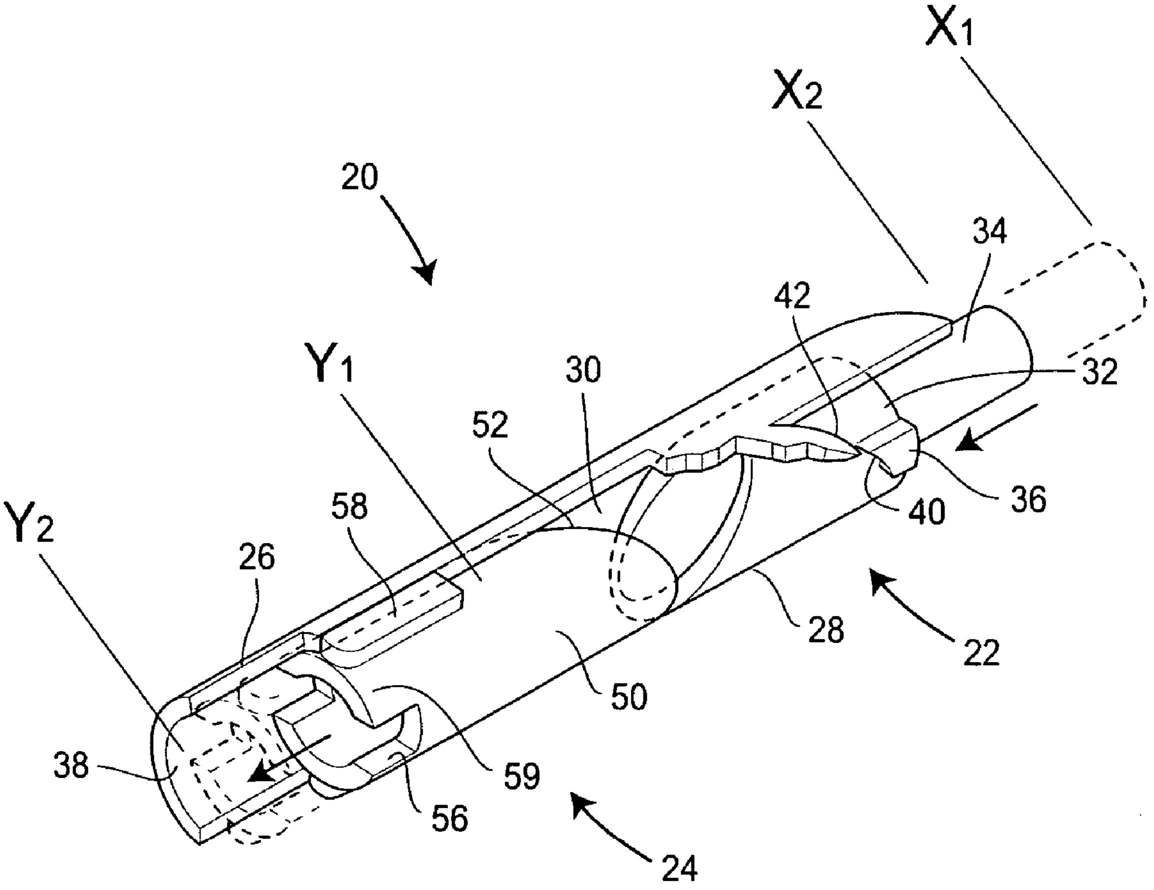
FIG. 3 is an enlarged isometric view of the advancing/retracting mechanism of FIG. 1 between the advanced state and the retracted state, with the barrel partially removed.

In advancing the advancing/retracting mechanism 20, as will be recognized by comparing FIGS. 2, 3, and 4, the user applies force to the first cam 22 to cause a movement of the first cam 22 from $X_1$ to $X_2$. The movement from $X_1$ to $X_2$ and the movement from $Y_1$ to $Y_2$, as will be later discussed, is indicative of the movement of the first end 28 of the first cam 22 and the second end 54 of the second cam 24, respectively. Concurrently, the angled surfaces 40 of the shoes 36 slidingly engage the helical-shaped surfaces 42 near the first end 77 of the barrel 26, and the sliders 58 of the second cam 24 are slidingly engaged with and near the top of the slots 60. As the user operatively places an axial force on the input end 32 of the first cam 22, as shown in FIG. 3, the shoes 36 of the first cam 22 may slide along the helical-shaped surfaces 42 consequently abutting various portions of the first angled surface 30 of the first cam 22 to various portions of the second angled surface 52 of the second cam 24. The second cam 24 may be constrained to axial movement and the first cam 22 may be caused to both rotate relative to the barrel 26 and translate linearly toward the bottom of the barrel 26, until the cams 22, 24 are in the extended position, i.e., the first and second mating surfaces 30, 52 only abut near the tips 66, 68 (FIGS. 4 and 5).

As a consequence thereof, the first and second cams 22, 24 will rotate relative to each other, thereby causing the output end 54 of the second cam 24 to move a distance from $Y_1$ to $Y_2$, which is greater than the distance $X_1$ to $X_2$ that the first cam 22 travels (compare FIGS. 2, 3, and 4).

The degree of the angle of the first angled surface 30 may be related to the amount of travel desired from the cams 22, 24 during operation. That is, if the angle α of the first angled surface 30 relative to the to the longitudinal axis of the first cam 22 is large then the second cam 24 will travel a relatively small distance along the longitudinal axis (FIG. 6). Similarly, if the angle α of the first angled surface 30 relative to the to the longitudinal axis of the first cam 22 is small, then the second cam 24 will travel a relatively large distance. According to one embodiment, the angle of the first angled surface 30 relative to the longitudinal axis may be between thirty and seventy degrees, and more specifically, may be approximately forty-five degrees.

In one exemplary embodiment, as shown in FIG. 5, the first and second mating surfaces 30, 52 of the first and second cams 22, 24 respectively, include twisting contoured surfaces 62, 64. The twisting contoured surfaces 62, 64 are thought to provide more than just a point of contact between the cams 22, 24 during operation. As best illustrated in FIG. 5, it is believed that a line, rather than a point, of contact will be achieved between the first cam 22 and the second cam 24 as the cams 22, 24 rotate relative to each other.

Specifically, when in the extended position, tips 66, 68 of the twisting contoured surfaces 62, 64 will be parallel to each other and substantially perpendicular to the longitudinal axis of the cams 22, 24. Similarly, bases 70, 72 of the twisting contoured surfaces 62, 64 are parallel to each other and substantially perpendicular to the longitudinal axis of the cams 22, 24. It is further believed that maintaining a line of contact may (i) allow for a greater transference of force between the cams 22, 24, (ii) increase the wear resistance of the cams 22, 24 and/or (iii) increase the smoothness of the sliding action of the cams 22 and 24 during rotation.

Figure 7:
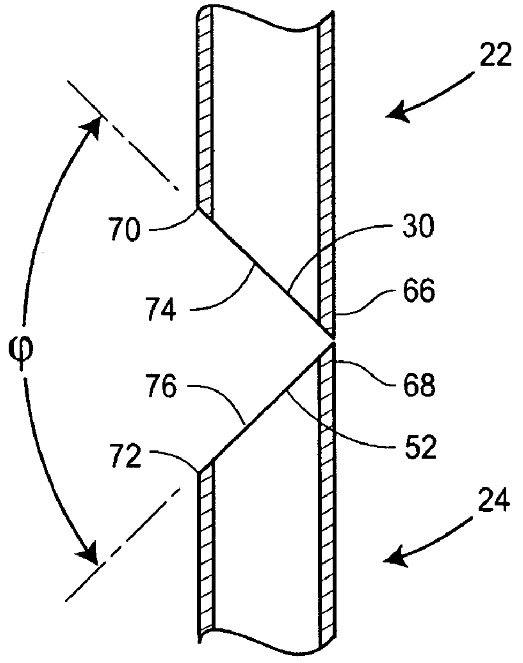
FIG. 7 is a cross-sectional view of another embodiment of an advancing/retracting mechanism in the advanced state, having a non-contoured angled surface, with the barrel removed.

In another embodiment of the mating surfaces 30, 52, as shown in FIG. 7, the mating surfaces 30, 52 may be untwisted, planar surfaces 74, 76. As the cams 22, 24 rotate relative to each other, a point, rather than a line, of contact may exist during various stages of rotation of the cams 22, 24. For example, when in the extended position, the tips 66, 68 of the planar surfaces 74, 76 will be oriented at an angle ϕ relative to each other, just as are the bases 70, 72.

The above exemplary embodiments may include many variations thereof, to achieve and/or create additional or alternative features.

For example, the first cam 22 and the second cam 24 may include more or less than two shoes 36 and sliders 58. The first cam 22 and the second cam 24 may also be or include other shapes, and more specifically, may include other shapes in cross-sections relative to a longitudinal axis of the cams 22, 24. For example the first or second cam 22, 24 may be round, triangular, square, rectangular, oval, or any cross-sectional shape, so long as it is able to move slidingly within and, in the case of the cam 22, to rotate within another component, such as the barrel 26. Similarly, as above, a portion of the first or second cam 22, 24 may be a shape other than round or a circular cylinder. The helical surfaces 42 of the barrel 26 may be one or more helical tracks, and the barrel 26 may include one or more slots 60.

The shoes 36 and sliders 58 of the first and second cams 22, 24 are also not restricted to the shape disclosed above. The shoes 36 and sliders 58, for example, may be round, triangular, oval, or any shape able to slidingly engage with the helical surfaces 42 and slots 60 of the barrel 26.

The interior of the cams 22, 24 may also be solid or hollow, depending on the desired usage. For example, if more contact area is desired between mating surfaces 30 and 52 of the first and second cams 22, 24 respectively, then the interior of the cams 22, 24 may be solid. If, however, it is desired to have part of a writing instrument extend upward through the barrel 26, then the interior of the cams 22, 24 may be hollow to accommodate various parts of the writing instrument.

Furthermore, the barrel 26 may include one or more portions, and the one or more portions of the barrel 26 may be an integral part of the housing 86. As such, the housing 86 may create a backing to the slots 60 disposed in the barrel 26, such that the slots 60 in this embodiment may be channels. Additionally and/or alternatively, the helical-shaped surfaces 42 and/or the slots 60 may be located on the barrel 26.

The helical surface 42 and the slots 60 are also not limited to being defined by the barrel 26, and the sliders 58 and the shoes 36 are not limited to being disposed on or depend from the first or second cams, 22, 24. More specifically, the helical surface 42 may be located on the first cam 22, and the shoes 36 may be part of the barrel 26. Similarly, the slots 60 may be located on the second cam 24, and the sliders 58 may be part of the barrel 26.

The advancing/retracting mechanism 20 will now be described as utilized in a writing utensil 82, and more specifically as utilized with a fountain pen. The fountain pen, as illustrated in FIG. 9, may include the advancing/retracting mechanisms 20, a housing 86, an output device assembly 88, and the input device 84.

In this exemplary embodiment, the housing 86 includes a first section **86*a* and a second section 86*b*. The housing 86 is generally tubular in shape and includes an aperture 100 at a first end 104 of the first second section 86*a*, and an opening 106 for the output device 88 at a second end 108 of the first section 86*b*. The housing 86 may further include an radially inward extending rim 110 defining a shoulder disposed near an opening 106 of the housing 86 for against which a spring 112** is disposed.

The input device 84 has a generally cup-shaped body 90 having an inner surface 92, a closed end 94 and an annular flange 96 depending from an open end 98. The input device 84 is operatively connected to the first cam 22. More specifically, the outer surface 48 of the post 34 is sized to rotate within the space defined by the inner surface 92 of the input device 84, such that when the user depresses the input device 84, the post 34 and hence the first cam 22, may rotate relative to and within the input device 84, thereby allowing the user to depress input device 84 without feeling the rotation of the first cam 22.

The length of the post 34 may be such that at full insertion of the post 34 into the input device 84, the second end 46 of the post 34 may abut the closed end 94 of the input device 84. As such, the closed end 94 translates force on to the post 34 and hence the first cam 22. The length of the post 34 may, however, be such that at full insertion of the post 34 into the input device 84, the annular flange 96 may abut the input end 32 of the first cam 22. Here, the surface area of flange 96 translates force on to input end 32 of the first cam 22.

Moreover, the annular flange 96 may secure the input device 84 within the housing 86. Specifically, as best illustrated in FIG. 9, the input device 84 may be sized and shaped to slide and rotate within in an area defined by the aperture 100 located at the first end 104 of the housing 86, but the input device 84 may be prevented from falling through the aperture 100 due to the annular flange 96 being larger than the aperture 100. The annular flange 96 may, therefore, abut the first end 104 of the housing 86 thereby securing the input device 84 in the housing 86.

Turning now to the output device assembly 88, the assembly 88 may include several individual parts that in combination may make up the output device assembly 88 as described herein. For example, the output device assembly 88 may include the writing tip 80 designed to place ink on a receiving surface such as paper, a well for holding the ink such as an ink cartridge, and an adapter for holding and combining the ink well and writing tip 80 together. Additional features or parts may be included as well.

Further, the output device assembly 88, may be generally cylindrical in shape and may include, in addition to the writing tip 80, a radially outward extending rim 116, a pair of radially outward extending knobs 120, and an axially extending post 122. The output device assembly 88 further includes a first end 114, second end 124, and a center section 118 therebetween. The writing tip 80 is located at a first end 114, and the radially outward extending rim 116 defines a shoulder depending from the center section 118. The pair of radially outward extending knobs 120 define an alignment feature depending from the center section 118.

The radially outward extending rim 116 compliments the radially inward extending rim 110, and is adapted to engage the spring 112. More specifically, in operation, the spring 112 is disposed between the two extending rims 110 and 116, and is compressed in the advanced position and is less compressed in the retracted position. In other words, the spring 112 provides a bias on the output device assembly 88 towards the retracted state.

The pair of radially outward extending knobs 120 are disposed opposite each other on the output device assembly 88, and are adapted to be disposed within the notches 56 located on the second cam 24. With the pair of radially outward extending knobs 120 disposed in the notches 56, the output device 88 is prevented from rotating relative to the second cam 24.

In the retracted state, the writing tip 80, as part of the output device assembly 88 of the writing utensil 82, is retracted into the housing 86. As such, the spring 112 may be slightly compressed, biasing the output device assembly 88, the advancing/retracting mechanism 20, and/or the output device 84 toward the first end 104 of the housing 86. The biasing of the spring 112 will cause the above components to be in a state of compression between the first end 104 of the housing 86 and the second end 106 of the housing 86, thereby eliminating undesired or uninitiated movement of the components within the housing 86 and/or the barrel 26. The spring 112 is disposed between the two extending rims 110 and 116, such that the bias of the spring 112 forces the output device assembly 88 against the second cam 24. More specifically, the pair of radially outward extending knobs 120 will be engaged with the notches 56 disposed on the second cam 24, thereby preventing rotation of the output device assembly 88 relative to the second cam 24. Furthermore, the advancing/retracting mechanism 20 will be in the retracted position, such that the input device 84 extends from the housing 86 through the aperture 100.

To extend the output device assembly 88, and more particularly, the writing tip 80 from the housing 86, the user activates or depresses the input device 84. The force from the input device 84 is operatively transmitted to the first cam 22, thereby causing the advancing/retracting mechanism 20 to the extended state. The second cam 24, as the notches 56 are engaged with the pair of radially outward extending knobs 120 on the output device assembly 88, will transmit motion of the advancing/retracting mechanism 20 to the output device assembly 88 and force the output device assembly 88 against the bias of the spring 112. Once the spring 112 has sufficiently compressed between the two extending rims 110 and 116, the writing tip 80 will extend from the housing 86 at the open end 106.

The above exemplary embodiment may include many variations thereof, thereby creating additional and/or alternative features. For example, the housing 86 may be a unitary structure. If, however, the housing 86 is constructed from two or more sections, the housing 86 may include threads or other fastening devices to secure the sections together. Similarly, the housing 86 may include a grip or related feature to create a more ergonomical writing utensil 82. It is also contemplated herein that the housing 86 may be part of the barrel 26 or that the housing 86 and the barrel 26 are an integral unit, thereby reducing the number of components that make up the writing utensil 82.

Similarly, the output device 88, input device 84 and housing 86 may be a variety of longitudinal cross-sectional shapes, such as oval, triangular or square. Similarly, the number and placement of various component may vary and be different. For example, the pair of knobs 120 may actually be one or more knobs 120, and may be located elsewhere on the output device 88, or may not exist at all. The knobs 120 may be eliminated due to the lack of rotational movement of the second cam 24. More specifically, one functional aspect of the knobs 120 is to restrict the rotational movement of the output device 88. By engaging the knobs 120 with the notches 56 in the second cam 24, which may also be limited in rotational movement due to the slider's 58 engagement with the slot 60, the output device 88 may not rotate. If the knobs 120 were to be eliminated, the output device 88 may still not undergo rotational movement, due to the lack of rotational movement of the second cam 24.

Figure 10:
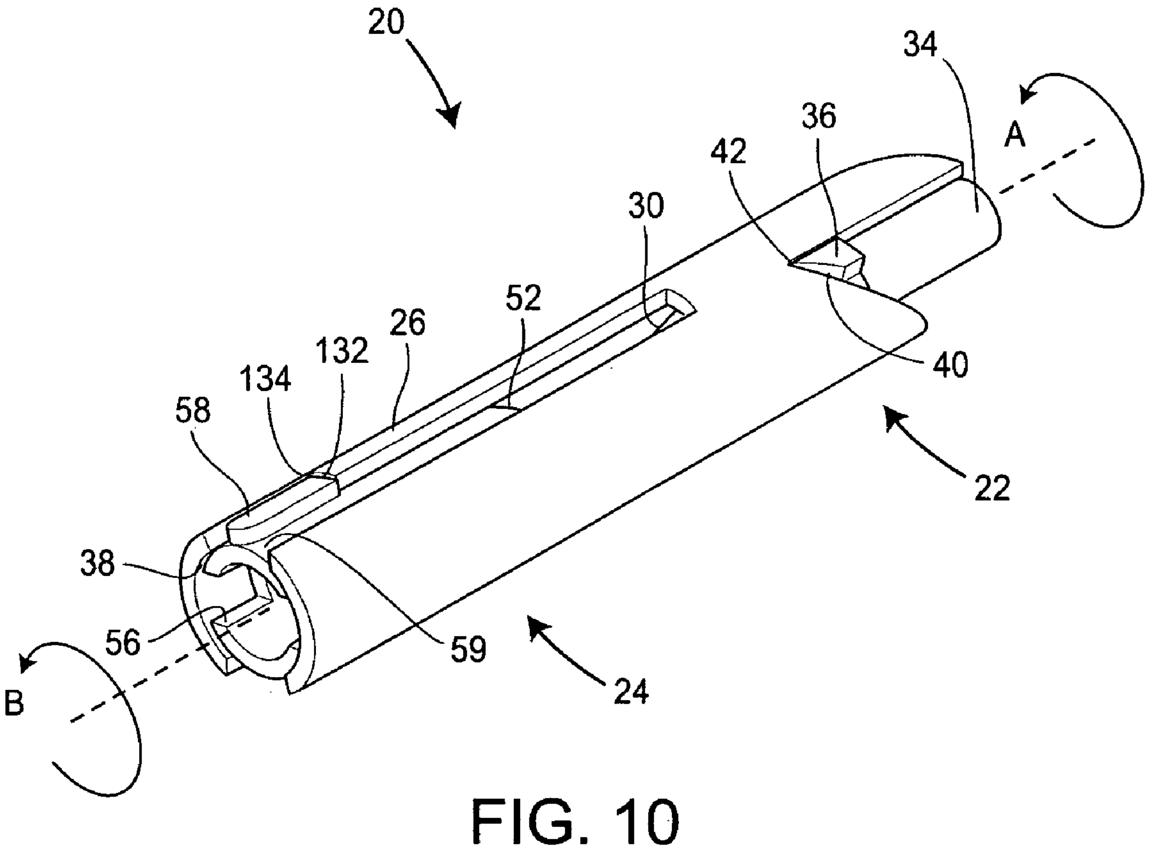
FIG. 10 is an enlarged isometric view of the advancing/retracting mechanism of FIG. 9 in an advanced state, and locked position, with the barrel partially removed.

The writing utensil 82 may also include a locking mechanism 129 to keep the writing tip 80 extended from the housing 86 after extension of the advancing/retracting mechanism 20. As seen in FIGS. 9 and 10, the barrel 26 may include a notch 130 disposed along one edge of the slot 60. In this exemplary embodiment, the notch 130 is disposed near the opening of the slot 60 at the second end 79 of the barrel 26. Alternatively, the writing utensil 82 may incorporate other locking mechanisms known in the art. More specifically, with alternate and/or additional components, the writing utensil 82 may be designed to include and/or have additional features. For example, the writing utensil 82 may include alternate and/or additional components to effectuate a one click locking/advancing and a one click unlocking/retracting advancing/retracting mechanism 20.

In operation, as seen in FIG. 10, during advancing of the advancing/retracting mechanism 20 the first cam 22 may rotate in the direction of arrow A and cause a tendency for the lower cam 24 to rotate in the direction of arrow B. As the second cam 24 traverses along the slot 60 during advancing, the slider 58 of the second cam 24 will traverse along the edge of the slot 60 toward which the second cam 24 tends to rotate. With the slider 58 having the tendency to rotate, the slider 58 will engage and rotate into the notch 130 once the slider 58 reaches the notch 130. Once the slider 58 is engaged with the notch 130, the user may remove pressure from the input device 84, thereby allowing the bias of the spring 112 to force an upper edge 132 of the slider 58 against an upper edge 134 of the notch 130 thereby securing or locking the lower cam 24, and hence the writing tip 80, in the advanced state.

The lower cam 24 and hence the writing tip 80 may be disengaged or unlocked from the notch 130 by pushing or rotating the slider 58 relative to the notch 130 and/or the barrel 26. More specifically, the user may manually cause the slider 58 to rotate out from or disengage the notch 130 by pushing or pulling the slider 58 with a fingertip, or the like, from the notch 130. As such, the housing 86 may include an access aperture 136 to permit access to the slider 58 and/or the notch 130. Once the slider 58 and notch 130 are disengaged, the bias of the spring 112 may cause the second cam 24 and hence the writing tip 80 to retract into the housing 86.

Furthermore, the present disclosure of the advancing/retracting mechanism 20 is not limited to being used in with a writing utensil 82, as described above, but may be used in many other types of devices. For example, the advancing/retracting mechanism 20 may be used to advance and retract several objects, such as an eraser in an eraser-pen type device, a blade in a penknife device, lead in a pencil, glue in a glue stick, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A advancing/retracting mechanism comprising:
- a first cam including an angled surface and one of a first shoe and a helical surface having an axis of rotation;
- a second cam including an angled surface and one of a second shoe and a surface perpendicular to the axis of rotation; and
- a barrel including the other of the first shoe and the helical surface and the other of the second shoe and the perpendicular surface, the first shoe abutting the helical surface and the second shoe abutting the perpendicular surface, at least a portion of one of the cams being disposed in the barrel,
- wherein the angled surfaces of the first and second cams substantially correspond in a first state, and are at least partially opposed in a second state, and the first cam travels a first distance along the longitudinal axis of the barrel from the first to the second state and the second cam travels a second distance that is greater then the first distance from the first to the second state.

2. The advancing/retracting mechanism of claim 1 wherein the first cam includes the first shoe that slidingly engages with the helical surface on the barrel.

3. The advancing/retracting mechanism of claim 1 wherein the second cam includes the second shoe that slidingly engages with the perpendicular surface on the barrel.

4. The advancing/retracting mechanism of claim 1 wherein the first and second cams abut along more than a point of contact in the second state.

5. The advancing/retracting mechanism of claim 1 wherein at least a portion of the angled surface is perpendicular to a longitudinal axis of the cam.

6. The advancing/retracting mechanism of claim 1 wherein the angled surface is non-planar.

7. An advancing/retracting mechanism comprising:
- a first cam including a first end and a second end, wherein the first end has a first angled surface and the second end operatively receives input from a user;
- a second cam including a first end and a second end, wherein the first end has a second angled surface that engages with the first angled surface, and the second end operatively activates an output device; and
- a barrel for receiving at least one of the first and second cams, the barrel including a helical surface, wherein a portion of the at least one of the first and second cams engages the helical surface as the at least one cam traverses from a first to a second position and rotates the cam relative to the other cam.

8. The advancing/retracting mechanism of claim 7 wherein the portion of at least one cam is a shoe.

9. The advancing/retracting mechanism of claim 7 wherein the portion of at least one cam slidingly engages with the helical surface of the barrel.

10. The advancing/retracting mechanism of claim 7 wherein the first and second cams abut along more than a point of contact in a second state.

11. The advancing/retracting mechanism of claim 7 wherein the first and second cams abut along a majority of the angled surfaces in a first state.

12. The advancing/retracting mechanism of claim 7 wherein the angled surface of at least one cam has a first and a second portion that are parallel to each other and perpendicular to the central axis of one of the cams.

13. An advancing/retracting mechanism comprising:
- a first cam including a first end and a second end, wherein the first end has a first angled surface and the second end operatively receives input from a user;
- a second cam including a first end and a second end, wherein the first end has a second angled surface that engages with the first angled surface, and the second end operatively activates an output device; and
- a barrel including an inner helical surface, wherein a portion of one of the first and second cams is actuated along the inner helical surface from a first axial position to a second position axial position and simultaneously rotates relative to the other of the first and second cams during the advancing/retracting process.

14. The advancing/retracting mechanism of claim 13 wherein the portion of at least one cam is a shoe.

15. The advancing/retracting mechanism of claim 13 wherein the portion of at least one cam slidingly engages with the helical surface of the barrel.

16. The advancing/retracting mechanism of claim 13 wherein the first and second cams abut along more than a point of contact in a second state.

17. The advancing/retracting mechanism of claim 13 wherein the first and second cams abut along a majority of the angled surfaces in a first state.

18. The advancing/retracting mechanism of claim 13 wherein the angled surface of at least one cam has a first and a second portion that are parallel to each other and perpendicular to the central axis of one of the cams.

* * * * *

UNITED STATES PATENT AND TRADEMARK OFFICE

CERTIFICATE OF CORRECTION

PATENT NO. : 7,066,042 B2
APPLICATION NO. : 10/753264
DATED : June 27, 2006
INVENTOR(S) : Neville E. Andrews et al.

It is certified that error appears in the above-identified patent and that said Letters Patent is hereby corrected as shown below:

<u>On the Title Page:</u>

At Item (73), “Sanford L.P.” should be -- Sanford, L.P.--

<u>In the Claims:</u>

At Column 10, line 47, Claim 13, “second position axial position” should be -- second axial position--

Signed and Sealed this

Fourth Day of December, 2007

JON W. DUDAS
*Director of the United States Patent and Trademark Office*